Nov. 26, 1968 C. L. GILES 3,413,409

COLOR TELEVISION SYSTEM WITH MEANS FOR PREVENTING KINESCOPE MISREGISTRATION

Filed Dec. 27, 1965 3 Sheets-Sheet 1

INVENTOR
Charles L. Giles

BY Brown and Mikulka and Richard L. Aitken
ATTORNEYS

INVENTOR
Charles L. Giles

BY Brown and Mikulka
and Richard L. Aitken
ATTORNEYS

INVENTOR
Charles L. Giles

BY Brown and Mikulka
and Richard L. Aitken
ATTORNEYS

United States Patent Office 3,413,409

Patented Nov. 26, 1968

3,413,409

COLOR TELEVISION SYSTEM WITH MEANS FOR PREVENTING KINESCOPE MISREGISTRATION

Charles L. Giles, Wilmington, Mass., assignor to Polaroid Corporation, Cambridge, Mass., a corporation of Delaware Filed Dec. 27, 1965, Ser. No. 516,319

17 Claims. (Cl. 178—5.4)

ABSTRACT OF THE DISCLOSURE

This specification discloses a color television system employing a penetration type kinescope adapted to produce red and white images in response to different electron beam velocities. The images produced by the high and low velocity electron beams are brought into registration by electrostatic lens effect, which is generated by means of an electrically conducting coating on the inner surface of the kinescope and electrically conducting film on the face of the kinescope. The coating and the film are separated to define an annular gap therebetween and different high voltage potentials are applied to the film and the coating. The resulting electrostatic field acts as an electrostatic lens operating on the electron beam to change the amount of its deflection. The potentials applied to the film and the coating are cyclically switched to change the effect of the electrostatic lens and also the velocity of the electrons in synchronism with the gating of different color video signals to the electron gun of the picture tube. In this manner, the electron velocity is cyclically switched to different levels to produce a different color image and the effect of the electrostatic lens is cyclically switched so that resulting images are brought into registration.

This invention relates to improvements in the electronic production of displays in color and more particularly to a color television receiver of the type in which different colors are produced by accelerating electrons to different velocities.

In color television receivers, in which different colors are produced by accelerating electrons to different velocities, the screen of the color picture tube may be formed of layers of light emissive materials, each of which produces a different color when excited by an impinging electron. The electrons are accelerated to different velocities which are selected so that the electrons will penetrate selectively to the different light emissive layers. The lowest velocity electrons will penetrate only to the innermost layer, nearest the cathode, and accordingly will excite only the innermost light emissive layer. The highest velocity electrons will penetrate through to the outermost layer so that all of the light emissive layers are excited. If there are three light emissive layers, then some of the electrons will be accelerated to a velocity to penetrate through the innermost layer to the middle layer but not through the middle layer so that only the innermost and middle layers are excited.

This penetration type of color television receiver is particularly useful in producing color displays which take advantage of the phenomenon that a multicolored scene can be perceived even though the objects in the scene are represented by different combinations of intensities of monochromatic and achromatic light. For example, a scene of multicolored objects can be perceived in full color even though the objects are represented in the scene by different intensity combinations of red and white light. This phenomenon is described in an article entitled "The Retinex" by Edwin H. Land in the June 1964 issue of American Scientist, pages 247 through 264.

Penetration type color television receivers which take advantage of this phenomenon of color perception may use picture tubes with two or more light emissive layers. Such a receiver using a picture tube with two layers is disclosed in the copending application Ser. No. 297,341, filed July 24, 1963, now Patent No. 3,290,434 and owned by the assignee of this application. A system using a picture tube with three light emissive layers is disclosed in the copending application Ser. No. 437,675, filed Mar. 8, 1965, now Patent No. 3,312,781 and owned by the assignee of this application.

In color television receivers of the penetrating type, a problem exists in that electrons accelerated to a higher velocity will be deflected a smaller amount in a given deflection field than electrons accelerated to a lower velocity. Accordingly, unless some compensation is provided the field scanned by the higher velocity electrons will be smaller than the field scanned by the lower velocity electrons and the image produced by the higher velocity electrons will not register with the image produced by the lower velocity electrons.

In accordance with the present invention the images produced by the high and low velocity electron beams are brought into registration by an electrostatic lens effect. The electrostatic lens is generated by means of an electrically conductive coating on the inner surface of the picture tube and an electrically conducting film on the face of the tube. The conductive coating is separated from the conducting film and different high voltage potentials are applied to the film and the coating. The resulting electrostatic field acts as an electrostatic lens operating on electron beam to change the amount of its deflection. The potentials are cyclically switched to change the effect of the electrostatic lens and also the velocity of the electrons in synchronism with the gating of different color video signals to the electron gun of the picture tube. In this manner the electron velocity is cyclically switched to different levels to produce the different color images and the effect of the electrostatic lens is cyclically switched so that the resulting images are brought into registration.

Accordingly, an object of the present invention is to provide an improved color television system.

A further object of the present invention is to provide an improved color television receiver making use of a penetration type picture tube.

A still further object of the present invention is to provide an improved system for compensating for the different deflections that the different velocity electrons receive in a color picture tube in which the different colors are produced by means of different electron velocities.

A still further object of the present invention is to provide a color television receiver of the type in which different colors are produced by different electron velocities wherein the different deflection that the different electron velocities would receive from the deflection field is compensated for by means of electrostatic lenses.

Further objects and advantages of the present invention will become readily apparent as the following detailed description of the invention unfolds and when taken in conjunction with the drawings wherein.

Figures 1, 2:
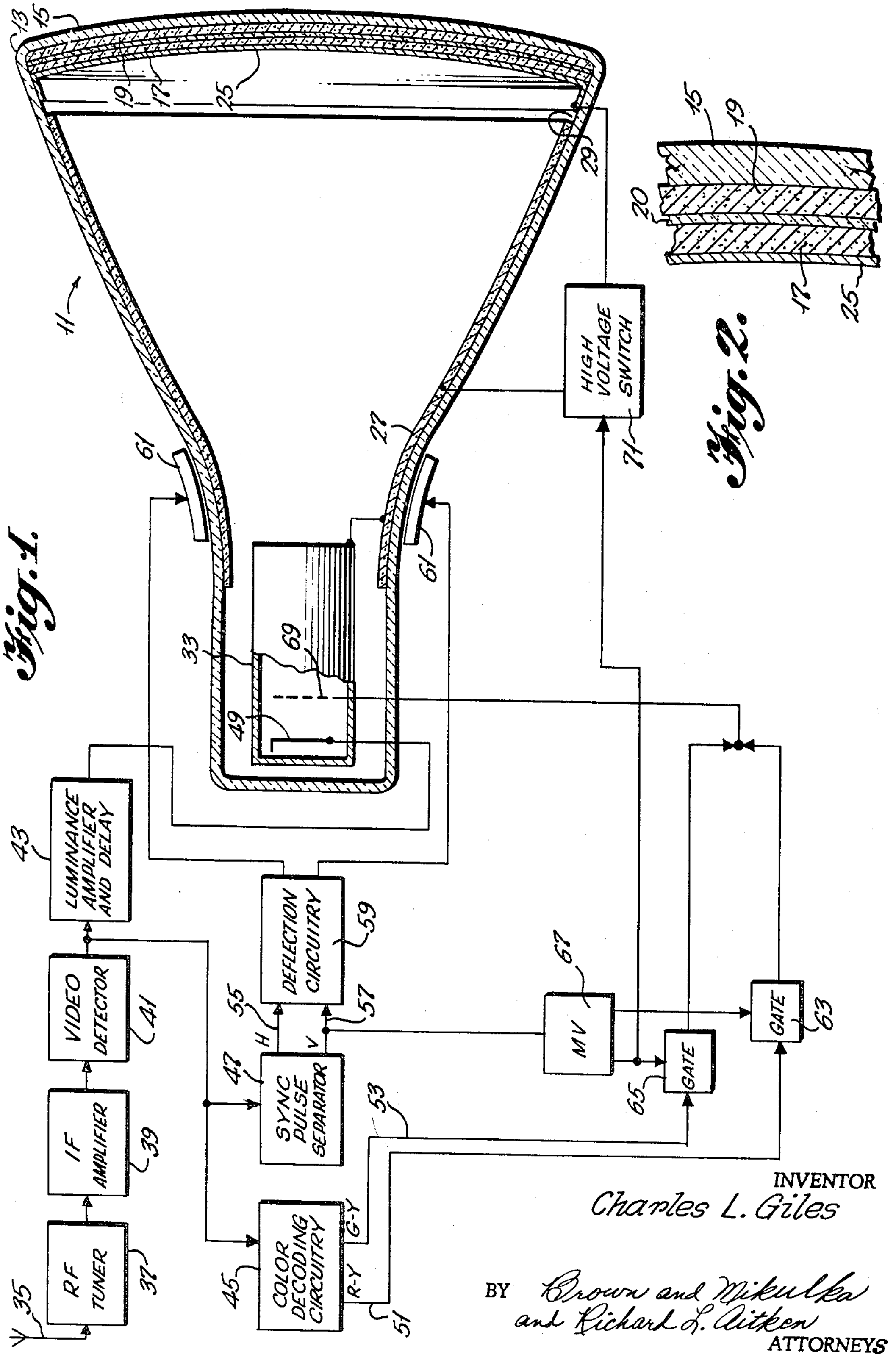
FIG. 1 is a block diagram illustrating a first embodiment of the present invention.
FIG. 2 is an enlarged sectional view of the screen of the picture tube of the system illustrated in FIG. 1.

The receiver shown in FIG. 1 comprises a color television kinescope or picture tube, which is designated generally by the reference number 11. The picture tube 11 comprises a glass envelope 13 having a face plate 15 defining the viewing screen of the picture tube. As best shown in FIG. 2 two luminescent layers 17 and 19 are formed on the inside surface of the face plate 15. A zinc sulphide film 20 separates the layers 17 and 19. The inner layer 17, which is the layer nearer the electron gun, is a luminescent phosphor which gives off red light when excited by an impinging electron. The outer layer 19 is a luminescent phosphor which gives off mixed green and blue light when excited by an impinging electron. An electrically conductive aluminum coating or film 25 overlies the phosphor layers inside the picture tube and extends a little past the edges of the face plate and onto the cone of the glass envelope. The cone and neck of the picture tube are covered by an electrically conductive coating 27, which comprises a graphite material known as "Aquadag." The Aquadag coating 27 is separated from the aluminum film 25 to define therebetween an annular gap 29 which is free of electrically conductive material. Thus, within the tube the coating 27 is electrically insulated from the film 25. An electron gun 33 is mounted in the neck of the tube and the anode of the electron gun is electrically connected to the electrically conductive coating 27.

The electron beam produced by the electron gun 33, is accelerated to either a first lower velocity or a second higher velocity when it strikes the screen of the picture tube. When the electron beam is accelerated to the first velocity it will penetrate only into the inner layer 17 so that only the inner layer is excited and gives off red light. When the electron beam is accelerated to the second velocity the electrons will have enough energy to penetrate through the inner layer 17 and into the outer layer 19 so that both the layers 17 and 19 are excited and give off their characteristic light. Accordingly, white light will be emitted from the screen when the electron beam strikes the screen with the second higher velocity to penetrate both the layers 17 and 19.

The system of FIG. 1 is a field sequential system so that the electron beam is first caused to scan the entire field of view on the screen with the first lower velocity and then caused to scan the entire field with the second higher velocity. The intensity of the electron beam is controlled in accordance with the red video in the detected color television signal when the screen is scanned with the first velocity and is controlled in accordance with the green video when the screen is scanned with the second electron velocity. Accordingly, images will be produced on the screen in red light in accordance with the red video and images will be produced on a screen in white light in accordance with the green video. The red and white images will be produced alternately on the screen in successive scannings of the field by the electron beam. The alternate red and white images will combine to be perceived as a full color image by the viewer.

As shown in FIG. 1 an antenna 35 in the television receiver of the present invention intercepts the RF color television signal and applies it to an RF tuner 37. The RF color television signal includes an RF picture wave which is amplitude modulated with the composite color video signal, including a luminance signal and a color subcarrier amplitude and phase modulated with the color information, in accordance with present broadcasting standards. The RF signal also includes sound information which is detected in a conventional manner, but which will not be described in the present application for purposes of simplification. The RF tuner converts the intercepted RF color television signal to IF and applies it to an IF amplifier 39, which amplifies the applied signal and applies it to a video detector 41. The video detector 41 converts the applied IF signal to the color video signal and applies the color video signal to a luminance amplifier and delay circuit 43, to a color decoder 45, and to a sync pulse separator 47. The luminance amplifier and delay circuit 43 amplifies the applied signal and delays it to compensate it for delays in the processing of the color signals and applies the resulting signal to the cathode 49 of the electron gun 33. The color decoder 45 in response to the color video signal from the video detector 41 produces an R–Y video signal on a channel 51 and a G–Y video signal on the channel 53. The R–Y signal is the red video minus the luminance or brightness and the G–Y signal is the green video minus the luminance or brightness. The sync pulse separator 47 separates out the horizontal sync pulses from the applied video signal and produces them on a channel 55 and separates out the vertical sync pulses from the applied video signal and produces them on a channel 57. The horizontal and vertical sync pulses produced on channels 55 and 57 are applied to deflection circuit 59, which generate the horizontal and vertical deflection signals and apply them to the horizontal and vertical deflection coils 61 of the picture tube 11. The deflection coils 61 are energized by the horizontal and vertical deflection signals to cause the electron beam to scan a viewing field on the screen of the picture tube in a conventional manner.

The R–Y signal produced on channel 51 is applied to a gate 63 and the G–Y signal produced on channel 53 is applied to a gate 65. The vertical sync pulses produced on channel 57 are also applied to a multivibrator 67 and each vertical sync pulse produced on channel 57 causes the multivibrator to switch to its opposite state. In one state the multivibrator 67 enables the gate 63 and in its opposite state the multivibrator 67 enables the gate 65. Since the vertical sync pulses are produced between successive scannings of the field, the gates 63 and 65 will be enabled alternately in successive scannings of the field. The output of the gates 63 and 65 are both applied to the control grid 69 of the electron gun 33. While the R–Y signal is applied to the grid 69 it coacts with the luminance signal applied to the cathode 49 to control the intensity of the beam in accordance with the red video and while the G–Y signal is applied to grid 69 is coacts with the luminance signal applied to the cathode 49 to control the intensity of the electron beam in accordance with the green video. Accordingly, the intensity of the electron beam is controlled alternately in accordance with the red video and the green video in successive scannings of the field by the electron beam.

The signal voltage produced by the multivibrator 67 controlling the gate 65 is also applied to a high voltage switch 71. The high voltage switch 71 is connected to control the potential applied to the aluminum film 25 and the Aquadag coating 27. The voltage applied to the film 25 by the high voltage switch 71 will control the velocity that the electrons strike the screen of the picture tube. The square wave voltage produced by the multivibrator 67 in synchronism with the vertical sync pulses when applied to the high voltage switch 71 causes the high voltage switch 71 to alternately apply 15 kilovolts and 10 kilovolts to the electrically conductive film 25. The 10 and 15 kilovolts will be switched in syncronism with the applied square wave and thus will be applied in alternate scannings of the viewing field by the electron beam. The 10 kilovolts is applied to the electrically conductive film 25 when the R–Y signal is applied to the control grid 69 and the 15 kilovolts is applied to the electrically conductive film 25 when the G–Y signal is applied to the grid 69. The 10 kilovolts applied to the electrically conductive film 25 will cause the electrons to strike the screen with a velocity sufficient to penetrate only to the inner luminescent layer 17 so that only the inner luminescent layer 17 is excited. Accordingly, only the inner luminescent layer 17 will be excited by the electron beam when R–Y video signal is applied to the grid 69. Thus while the R–Y signal is applied to the grid 69 the image represented by the red video will be reproduced on a screen in red light. The 15 kilovolts applied by the high voltage switch 71 to the electrically conductive film 25 will cause the electrons to strike the screen with a velocity to penetrate through the inner luminescent layer 17 into the outer luminescent layer 19 so that both the inner and outer layers 17 and 19 are excited. Accordingly, both the layers 17 and 19 will be excited and will give off light while the G–Y video signal is applied to the control grid 69 and thus the image represented by the green video will be reproduced on the screen in white light while the G–Y signal is applied to the grid 69. Thus, red and white images are alternately produced on the screen and the red and white images correspond to the red and green video. The red and white images produced alternately on the screen will be perceived by the viewer as a full color representation of the transmitted picture.

In order for the red and white images to combine properly to be perceived as the full color representation of the transmitted picture, the red and white images must register. However, the deflection field applied to the electron beam by the deflection coils will tend to deflect the lower velocity electrons to a greater degree than the higher velocity electrons. This difference in deflection would cause one of the images to be larger than the other and the images accordingly would not register. To prevent this misregistration of images, the high voltage switch 71 also applies a high voltage waveform to the electrically conductive coating 27 and to the anode of the electron gun. This high voltage waveform is the inverse of the waveform applied by the high voltage switch to the conducting portion 25; that is, when the high voltage switch 71 applies 15 kilovolts to the conductive film 25 it applies 10 kilovolts to the conductive coating 27 and when the high voltage switch applies 15 kilovolts to the conductive film 25 it applies 10 kilovolts to the conductive coating 27. Thus the conductive film 25 and the conductive coating 27 are switched back and forth between 15 and 10 kilovolts in synchronism. When 15 kilovolts is applied to the aluminum film 25 and 10 kilovolts is applied to the Aquadag coating 27, the resulting electrostatic field will act as a convergent lens tending to reduce the deflection of the electron beam. When the film 25 is at 10 kilovolts and the coating 27 is at 15 kilovolts, the resulting electrostatic field will act as a divergent lens, which will increase the deflection of the electron beam. When 10 kilovolts are applied to the coating 27 and 15 kilovolts are applied to the film 25, the electrons in the beam passing through the deflection field generated by the coils 61 will have a velocity corresponding to 10 kilovolts and when they near the screen they are accelerated to 15 kilovolts as they pass through the electrostatic convergent lens. When 15 kilovolts are applied to the coating 27 and 10 kilovolts are applied to the film 25, the electrons in the beam will have a velocity corresponding to 15 kilovolts as they pass through the deflection field generated by the coils 61, and when the electrons approach the screen, they are decelerated to a velocity corresponding to 10 kilovolts as they pass through the electrostatic divergent lens. Thus the electrons which produce the white image will have a lower velocity in the deflection field than the electrons which produce the red image. Accordingly, when the electron beam is producing the white image it will be deflected more by the deflection field than it will be deflected by the deflection field when it is producing the red image. When the white image is being produced the electrostatic lens is convergent and when the red image is being produced the electrostatic lens is divergent. Thus when the white image is being produced the electron beam will be deflected a greater amount by the deflection field but the deflection of the beam will be reduced by the action of the electrostatic lens and when the red image is being produced the electron beam will be deflected a lesser amount but the deflection will be increased by the action of the electrostatic lens. The voltage applied to the coating 27 and the film 25 are selected so that the increased deflection provided by the divergent lens and the decreased deflection provided by the convergent lens are such that the resulting white image produced on the screen registers with the resulting red image.

Figure 3:
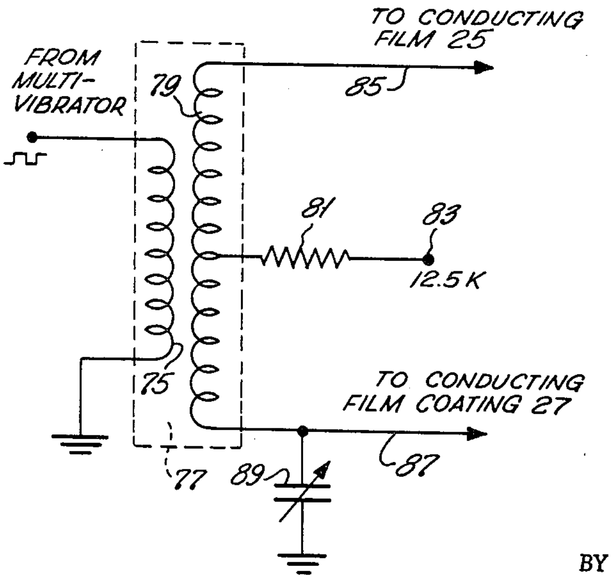
FIG. 3 is a circuit diagram of a high voltage switch used in the system illustrated in FIG. 1.

The circuitry of the high voltage switch 71 is illustrated in FIG. 3. As shown in FIG. 3 the square waveform produced by the multivibrator 67 is applied to the primary winding 75 of the transformer 77, which has a center tapped secondary winding 79. The center tap of the secondary winding 79 is connected through a resistor 81 to a positive source of 12.5 kilovolts applied at a terminal 83. A conductor 85 connects one end of the secondary winding 79 to the electrically conductive film 25 and a conductor 87 connects the other end of the secondary winding 79 to the coating 27. A variable capacitor 89 is connected between a conductor 87 and ground. The square wave as supplied from the multivibrator 67 to the primary winding 75 causes the conductors 85 and 87 to alternately switch between potentials of 10 kilovolts and 15 kilovolts with the conductor 87 being 15 kilovolts when the conductor 85 is 10 kilovolts and vice versa. In this manner the film 25 and coating 27 are alternately driven between 10 and 15 kilovolts.

The film 25 and the coating 27 comprise capacitive loads on the transformer 77 and the capacitor 89 provides a means for adjusting the balance of the two loads. By means of the capacitor 89 the precise potential levels between which the conductor 87 is switched can be adjusted relative to those between which the conductor 85 is switched if such adjustment is necessary to achieve precise registration of the red and white images.

The system disclosed in FIG. 1 is a field sequential system wherein red and white images are alternately produced on the screen of the picture tube. The system of FIG. 1 is referred to as a binary system because only two different colors are produced to combine to be perceived as a full color image on the screen. The system of FIG. 1 could be modified to be a line sequential system instead of a field sequential system. In a line sequential system the horizontal sync pulses would have to be used intsead of the vertical sync pulses to control the gating of the R–Y and G–Y video signals to the control grid 69 so that the R–Y and G–Y video signals would appear on the control grid 69 on alternate scans of each line. Also the high voltage switching of the potentials on the film 25 and the coating 27 of the electrically conductive film would have to be switched in synchronism with the switching of the red and green video signals applied to the control grid 69. In such a system this switching would also be accomplished in response to the horizontal sync pulses instead of the vertical sync pulses.

Figure 5:
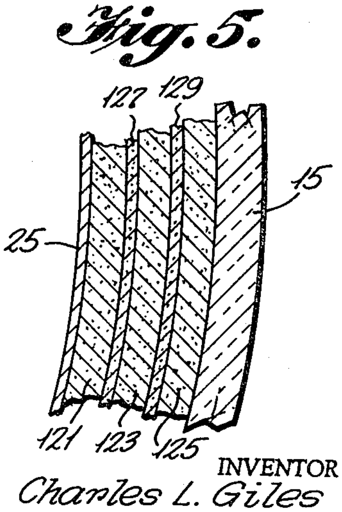
FIG. 5 is an enlarged sectional view of the screen of the picture tube of the system illustrated in FIG. 4.
Figure 4:
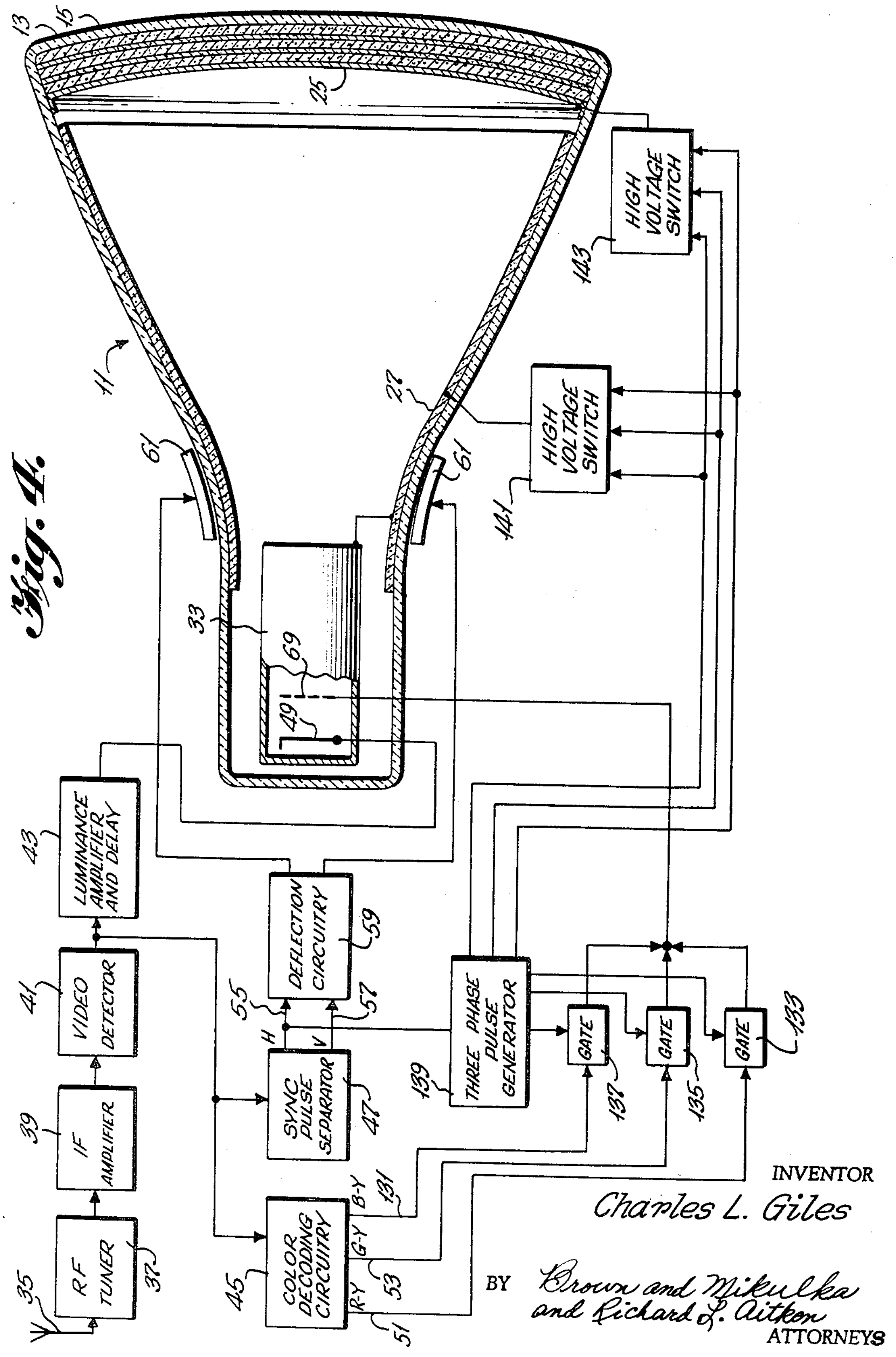
FIG. 4 is a schematic block diagram illustrating another embodiment of the present invention.

The three color system illustrated in FIG. 4 like the system of FIG. 1 comprises an antenna 35, an RF tuner 37, an IF amplifier 39, a video detector 41, a luminance amplifier and delay circuit 43, a sync pulse separator 47, deflection circuitry 59, and color decoding circuitry 45, which function generally in the same manner as in the system of FIG. 1. The picture tube 11 in the system of FIG. 4 is also similar to the picture tube in the system of FIG. 1 except that in the system of FIG. 4 the picture tube 11 has three layers of phosphor instead of two, as is best illustrated in the enlarged sectional view of the screen of the picture tube in FIG. 5. As shown in FIG. 5 the three layers of phosphor which are designated by the reference numbers 121, 123 and 125 sandwiched between the glass face 15 of the envelope and the electrically conductive aluminum film 25. The layers 121, 123, and 125 are separated by zinc sulphide films, which are designated by the reference numbers 127 and 129. When the phosphor layer 121 is excited by an impinging electron it gives off red light. When the layer 123 is excited by an impinging electron it gives off green light and when the layer 125 is excited by an impinging electron it gives off blue light. Accordingly, when an electron is accelerated to a velocity such that it penetrates only to the layer 121, it will cause only red light to be emitted from the screen. When an electron is accelerated to a velocity such that it penetrates through the layer 121 into the layer 123 it will cause both green and red light to be given off, and when an electron is accelerated to a velocity such that it penetrates through the layers 121 and 123 into the layer 125 it excites all three layers and causes red, green and white light to be given off. The red and green light combination caused by the intermediate velocity electrons combine to make a greenish-white or warm white light, whereas the red, green and blue light combination produced by the high velocity electrons combine to produce a cool white light. In accordance with the invention the system of FIG. 4 is a line sequential system in which a first horizontal line is scanned with a high velocity beam of electrons, which penetrate to the layer 125. The next horizontal line is scanned with electrons of intermediate velocity, which penerate to the layer 123. Then a third horizontal line is scanned with a beam of high velocity electrons, which penetrate to the layer 121 and the sequence is cyclically repeated throughout the entire field.

The intensity of the low velocity electrons which penetrate to the layer 121 is controlled in accordance with the red video. The intensity of the intermediate velocity electrons which penetrate to the layer 123 is controlled in accordance with the green video and the intensity of the high velocity electrons which penetrate to the layer 125 is controlled in accordance with the blue video. The light giving off from all three layers 121, 123, and 125 will then combine to be perceived by the viewer as a full color image of the picture represented by the detected color television signal.

The color decoding circuitry 45 in addition to producing R–Y and G–Y video signals on channels 51 and 53 also produces a B–Y video signal on a channel 131. The B–Y signal is the blue video minus the luminance. The R–Y and G–Y video signals produced on channels 51 and 53 are applied to gates 133 and 135 and the B–Y video signal produced on channel 131 is applied to a gate 137. The outputs of the gates 133, 135, and 137 are connected to the control grid 69 of the picture tube 11. The enabling of the gates 133, 135, and 137 is controlled by a three phase pulse generator 139 in response to the horizontal sync pulses which are applied to three phase pulse generator from channel 55. The three phase pulse generator enables the gates 133, 135, and 137 cylically in sequence and switches to enable the succeeding gate in the sequence is response to each applied horizontal sync pulse. The three phase pulse generator may for example be a ring counter. The gate 137 will be enabled for the scanning of one horizontal line whereupon the gate 135 will be enabled for the scanning of the next sequential horizontal line and the gate 133 will then be enabled for the scanning of the next sequential horizontal line. The sequence then starts over with the gate 137 being enabled for the next sequential scanning of a horizontal line. In this manner the R–Y, G–Y, and B–Y video signals are applied to the control grid 69 cyclically in sequence in synchronism with the horizontal sync pulses. The three phase pulse generator 39 also applies pulses to high voltage switches 141 and 143. The high voltage switch 141 applies a high voltage step waveform to the Aquadag coating 27 and the anode of the electron gun connected therewith. The high voltage switch 143 applies a step waveform to the aluminum film 25 on the face of the picture tube. The step waveform produced by the high voltage switch 143 is the inverse of the waveform produced by the high voltage switch 141.

Figure 6:
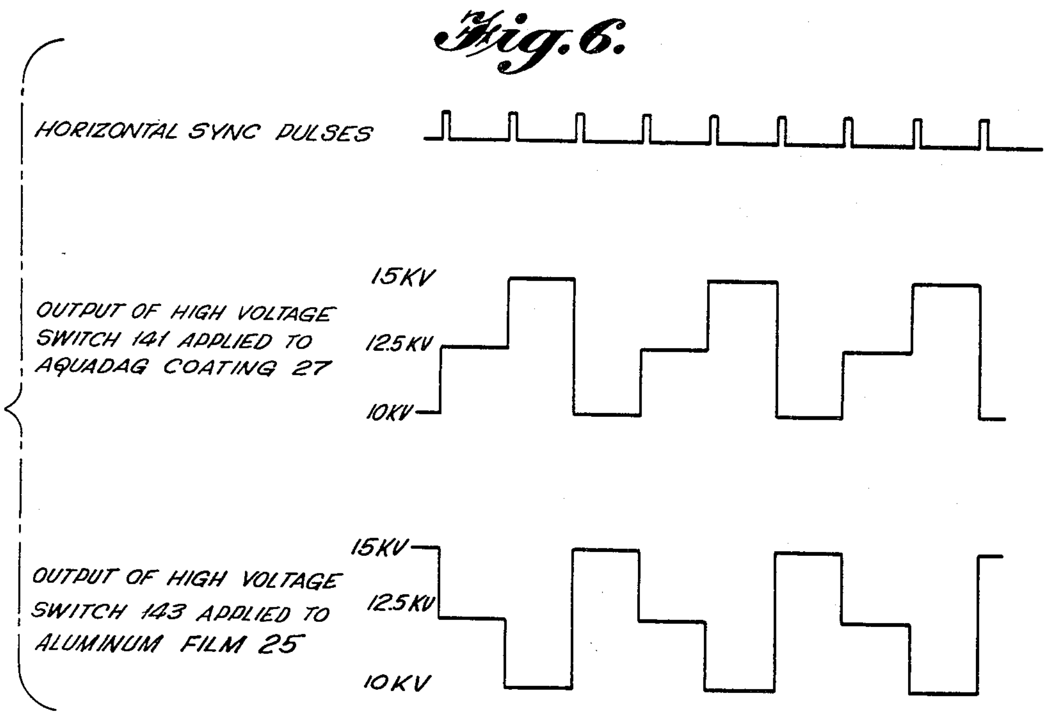
FIG. 6 illustrates a set of waveforms which are produced in the embodiment illustrated in FIG. 4.

The waveforms produced by the high voltage switches 141 and 143 are illustrated in FIG. 6. As shown in FIG. 6 the waveform produced by the high voltage switch 141 varies in steps from 10 kilovolts to 12.5 kilovolts to 15 kilovolts and then back to 10 kilovolts in synchronism with the horizontal sync pulses. The waveform produced by the high voltage switch 143 changes in steps in synchronism with the horizontal sync pulses from 15 kilovolts to 12.5 kilovolts to 10 kilovolts and then back to 15 kilovolts whereupon the cycle is repeated. When the output of the high voltage switch 141 is at 10 kilovolts the output of the high voltage switch 143 will be at 15 kilovolts and vice versa. When the output of the high voltage switch 141 is at 12.5 kilovolts the output of the high voltage switch 143 will be at 12.5 kilovolts. The voltage produced by the high voltage switch 143 will control the velocity with which the electron beam impinges the three layers of phospor on the screen of the picture tube. When the high voltage switch 143 supplies 10 kilovolts to the aluminum film the electron beam will penetrate only to the phosphor layer 121. When the high voltage switch 143 applies 12.5 kilovolts to the aluminum film 25, the electron beam will penetrate to the intermediate phosphor layer 123. When the high voltage switch 143 applies 15 kilovolts to the aluminum film 25 the electron beam will penetrate to the outer layer 125. The step waveform applied to the aluminum film is synchronised with the switching of video signals applied to the control grid 69 so that 10 kilovolts is applied to the aluminum film 25 when the R–Y video signal is applied to the control grid 69, 12.5 kilovolts is applied to the aluminum film 25 when the G–Y video signal is applied to the control grid 69 and 15 kilovolts is applied to the aluminum film 25 when the B–Y video signal is applied to the control grid 69. Thus the image produced by the electrons penetrating only to the innermost layer 121 will be controlled by the red video, the image produced by the electrons penetrating into the layer 123 will be controlled by the green video, and the image produced by the electrons penetrating to the layer 125 will be controlled by the blue video. Accordingly, an image will be produced in red light corresponding to the red video, an image will be produced in greenish-white light corresponding to the green video, and an image will be produced in cool white light corresponding to the blue video. These three images will combine to be perceived by the viewer as a full color image in accordance with the detected color television signal.

As pointed out above whenever the high voltage switch 143 applies 15 kilovolts to the electrically conducting film 25, the high voltage switch 141 applies 10 kilovolts to the Aquadag coating 27 and to the anode of the electron gun. This creates a convergent electrostatic lens between the Aquadag coating and the aluminum film 25. The electrons when they pass through the deflection field of the coil 61 will have a velocity corresponding to the 10 kilovolts applied to the Aquadag coating and to the anode of the electron gun. When 12.5 kilovolts are applied to the aluminum film 25, 12.5 kilovolts will also be applied to the Aquadag coating and to the anode of the electron gun so no electrostatic lens effect will be produced. When these voltages are applied by the high voltage switches 141 and 143 to the coating 27 and the film 25, the electrons will have a velocity corresponding to 12.5 kilovolts when they pass through the deflection field, and accordingly, will not be deflected as much as the electrons which travel through the deflection field with the velocity corresponding to 10 kilovolts. Thus it will be seen that the electrons, which are acted on by the convergent electrostatic lens, have a greater deflection in the deflection field than the electrons which have a velocity corresponding to 12.5 kilovolts. The convergent lens serves to decrease the deflection of the electrons so that the total deflection of the electron beam upon striking the screen is the same as the electrons which have a velocity corresponding to 12.5 kilovolts. Thus the image produced by the high velocity electrons, which penetrate to the layer 125, will coincide with the image produced by the intermediate velocity electrons which penetrate only to the layer 123. When the high voltage switch 143 applies 10 kilovolts to the aluminum film 25, the high voltage switch 141 applies 15 kilovolts to the Aquadag coating 27 and to the anode of the electron gun. According the low velocity electrons which penetrate only to the layer 121 have a high velocity corresponding to 15 kilovolts when they travel through the deflection field, and will be deflected less in the deflection field than the intermediate velocity electrons which have a velocity corresponding to 12.5 kilovolts in the deflection field. When 10 kilovolts are applied to the aluminum film 25 and 15 kilovolts applied to the Aquadag coating, a divergent electrostatic lens is produced which tends to increase the deflection of the electrons. Thus the low velocity electrons which penetrate only to the layer 121 will have a decreased deflection due to their high velocity while passing through the deflection field of the deflection coils 61, but then will have an increased deflection due to the electrostatic lens effect between the Aquadag coating 27 and the electrically conductive film 25. The increased deflection provided by the electrostatic lens will compensate for the decreased deflection in the deflection field and the image produced by the low velocity electrons will register with the images produced by the intermediate and high velocity electrons.

Thus the present invention provides television systems of the penetration type in which registration of the images is achieved electrostatically. The present invention is applicable to penetration type television systems designed in accordance with classical or "Newtonian" color theory. The present invention is applicable to any type of color television system in which different colors are produced by accelerating the electron beam to different velocities. For example, instead of using a picture tube in which the phosphor is formed in layers on the screen of the tube, a picture tube in which the screen is formed of spheroids with the different color phosphors located at different depths within the spheroids could be used. It is within the scope of the present invention to separate the Aquadag coating into two or more parts to provide electrostatic lenses at different points in the tube to achieve the desired registration. These and many other modifications may be made to the above described specific embodiments of the invention without departing from the spirit and scope of the invention, which is defined in the appended claims:

What is claimed is:

1. A display system comprising a kinescope having an electron gun for producing an electron beam and a viewing screen, deflection means to generate a deflection field to deflect said electron gun to cyclically scan a field on said viewing screen, means to vary the velocity with which the electrons of said beam impinge upon said screen, and means to generate an electrostatic lens within said kinescope and to vary the effect of said electrostatic lens in synchronism with the variation in velocity of the electrons as they impinge upon said screen in a manner such that the total amount of deflection of the electron beam at said screen for a given deflection field generated by said deflection means will be the same for each velocity with which the electrons impinge upon said screen, said means to generate an electrostatic lens comprising a first electrically conducting means positioned near said screen, an annular second electrically conducting means surrounding said electron beam, spaced from said first conducting means and defining with said first conducting means an annular gap around said electron beam, and means to apply a voltage between said first and second conducting means varying in synchronism with the variation in velocity with which the electrons of said electron beam impinge upon said screen, said electrostatic lens being formed by the electrostatic field between said first and second conducting means.

2. A display system as recited in claim 1 wherein said first electrically conducting means comprises an electrically conducting film on said screen and said second conducting means comprises an annular electrically conducting coating on the envelope of said kinescope spaced from said conducting film to define said annular gap therebetween.

3. A display system as recited in claim 1 wherein said means to vary the velocity with which the electrons of said electron beam impinge upon said screen comprises means to cyclically switch said velocity between velocity levels, and wherein said means to apply a voltage between said first and second electrically conducting members cyclically switches said voltage in synchronism with the switching of the velocity with which the electrons of said electron beam impinge upon said screen.

4. A display system as recited in claim 3 wherein said means to apply a voltage between said first and second conducting means cyclically alternates the polarity of the voltage between said conducting means in synchronism with the switching of the velocity with which the electrons in said electron beam impinge upon said screen.

5. A color television display system comprising a color picture tube having an electron gun to generate an electron beam and a viewing screen adapted to produce different colors when excited by impinging electrons of different velocities, means to present a color video signal representing a multicolor image, and means to control said electron beam to produce a multicolor image upon said screen in accordance with said video signal, said means to control said electron beam including means to vary the velocity with which the electrons of said electron beam impinge upon said screen, means to apply a deflection field to said electron beam, and means to generate an electrostatic lens within said picture tube acting upon said electron beam and to vary the effect of said electrostatic lens in synchronism with the variation in velocity with which the electrons of said electron beam impinge upon said screen in a manner such that the total amount of deflection of the electron beam at said screen for a given deflection field applied to said electron beam will be the same for each velocity with which the electrons of said electron beam impinge upon said screen, said means to generate an electrostatic lens comprising a first electrically conducting means positioned near said screen, an annular second electrically conducting means surrounding said electron beam, spaced from said first conducting means and defining with said first conducting means an annular gap around said electron beam, and means to apply a voltage between said first and second conducting means varying in synchronism with the variation in velocity with which the electrons of said electron beam impinge upon said screen, said electrostatic lens being formed by the electrostatic field between said first and second conducting means.

6. A color television display system as recited in claim 5 wherein said first electrically conducting means comprises an electrically conducting film on said screen and said second electrically conducting means comprises an electrically conducting coating on the envelope of said picture tube spaced from said film to define said annular gap.

7. A color television display system comprising a color picture tube having an electron gun to generate an electron beam, a viewing screen adapted to produce different colors when excited by different velocities, a first conducting member near said screen, an annular second conducting member surrounding said electron beam spaced from said first conducting member toward said electron gun to define an annular gap between said first and second conducting members around said electron beam, means to produce a color video signal representing a multicolor image, and means responsive to said video signal to control said electron beam to produce a multicolor image on said screen in accordance with said video signal, said means to control said electron beam including means to cyclically switch high positive potentials applied to said first conducting member to produce a plurality of images of different chromatic contents and to cyclically switch high positive potentials applied to said second conducting member between different potential levels in synchronism with the switching of potentials on said first conductive member, the switching of potentials on said second conductive member being in the opposite direction from the switching of potentials on said first conducting member, and the resulting electrostatic field between said first and second conducting members forming an electrostatic lens acting on said electron beam to maintain said images of different chromatic contents in registration.

8. A color television display system as recited in claim 7 wherein the potential waveform applied to said second conducting member is the inverse of the potential waveform applied to said first conducting member.

9. A color television display system as recited in claim 7 wherein said first conducting member comprises a conductive film on the face of said screen and said second conducting member comprises an electrically conducting coating on the surface of the envelope of said picture tube.

10. A color television display system as recited in claim 7 wherein said means to cyclically switch high positive potentials applied to said first and second conducting members cyclically alternates the polarity of the voltage between said first and second conducting members.

11. A color television display system comprising a color picture tube having an electron gun to generate an electron beam and a viewing screen adapted to produce a first color when excited by impinging electrons with a first velocity and to produce a second color when excited by electrons with a second velocity, a first conducting member near said screen, an annular second conducting member surrounding said electron beam spaced from said first conducting member toward said electron gun to define an annular gap between said first and second conducting members around said electron beam, means to present a color video signal to represent a multicolored image, and means responsive to said video signal to control said electron beam to produce a multicolored image on said screen in accordance with said video signal, said means to control said electron beam including means to apply a square wave alternating between high positive potentials to said first conducting member to cyclically switch the velocity with which the electrons of said electron beam impinge upon said screen between said first and second velocities to produce images of different chromatic contents, and means to apply a square wave to said second conducting member alternating between high positive potential levels in synchronism with the switching of potentials applied to said first conducting member but switching between the potentials in the opposite direction from the switching of potential applied to said first conducting member, the resulting electrostatic field between said first and second conducting members forming an electrostatic lens acting on said beam to maintain said images in registration.

12. A color television display system as recited in claim 11 wherein the square wave applied to said second conducting member alternates between the same potential levels that the square wave applied to said first conducting member alternates between.

13. A color television display system as recited in claim 11 wherein said first conducting member comprises an electrically conducting film on said screen and said second electrically conducting member comprises a coating on the envelope of said picture tube.

14. A color television display system comprising a color picture tube having an electron gun to generate an electron beam and a viewing screen adapted to produce first, second and third colors when excited by impinging electrons with first, second and third velocities, respectively, a first conducting member near said screen, an annular second conducting member surrounding said electron beam spaced from said first conducting member toward said electron gun to define an annular gap therebetween around said electron beam, means to present a color video signal to represent a multicolored image, and means responsive to said color video signal to control said electron beam to produce a multicolored image on said screen, said means to control said electron beam including means to switch a high positive potential applied to said first conducting member between first, second and third potential levels to cause the electrons of said electron gun to impinge upon said screen with said first, second and third velocities to produce images of said first, second and third colors, means to cyclically switch a high positive potential applied to said second conducting member between three potential levels in synchronism with the switching of the potential applied to said first conducting member, the potential levels applied to said second conductive member being selected so that the electrostatic field between said first and second conducting members forms an electrostatic lens acting on said electron beam cyclically changing in synchronism with the switching of the potential level applied to said first conductive member to make said first, second and third color images coincide.

15. A color television display system as recited in claim 14 wherein the three potential levels between which said second conductive means is switched comprises said first, second and third potential levels, said second conductive member being switched to the lowest of said first, second and third potential levels when said first conductive member is switched to the highest of said first, second and third potential levels, being switched to the highest of said first, second and third potential levels when said first conductive member is switched to the lowest of said first, second and third potential levels and being switched to the intermediate potential level of said first, second and third potential levels when said first conductive member is switched to the intermediate potential level of said first, second and third potential levels.

16. A color television display system as recited in claim 14 wherein said first conducting member comprises an electrically conducting film on said screen and said second conductive member comprises an electrically conducting coating on the envelope of said picture tube.

17. A color television display system as recited in claim 14 wherein said means to cyclically switch a high positive potential applied to said second conducting member cyclically alternates the polarity of the potential of said second conducting member with respect to said first conducting member.

References Cited

UNITED STATES PATENTS

| | | | |
|---|---|---|---|
| 3,284,662 | 11/1966 | Kagan. | |
| 3,339,016 | 8/1967 | Merryman | 178—5.4 |

ROBERT L. GRIFFIN, *Primary Examiner.*